April 30, 1935.  J. J. KIERGARD  1,999,241
CONTINUOUS EXTRACTING DEVICE
Filed Aug. 14, 1933   2 Sheets-Sheet 1
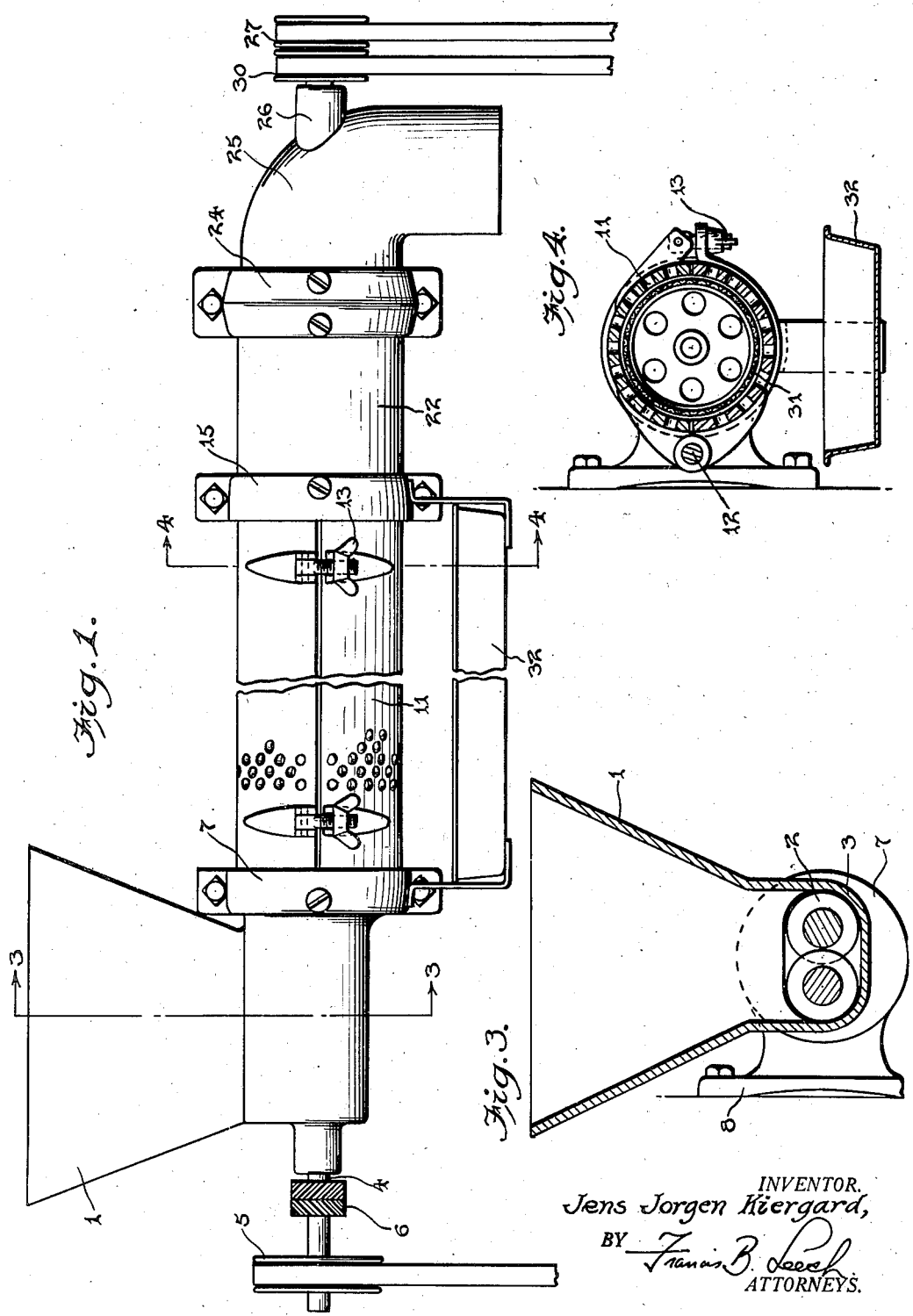
INVENTOR.
Jens Jorgen Kiergard,
BY Francis B. Leech
ATTORNEYS.

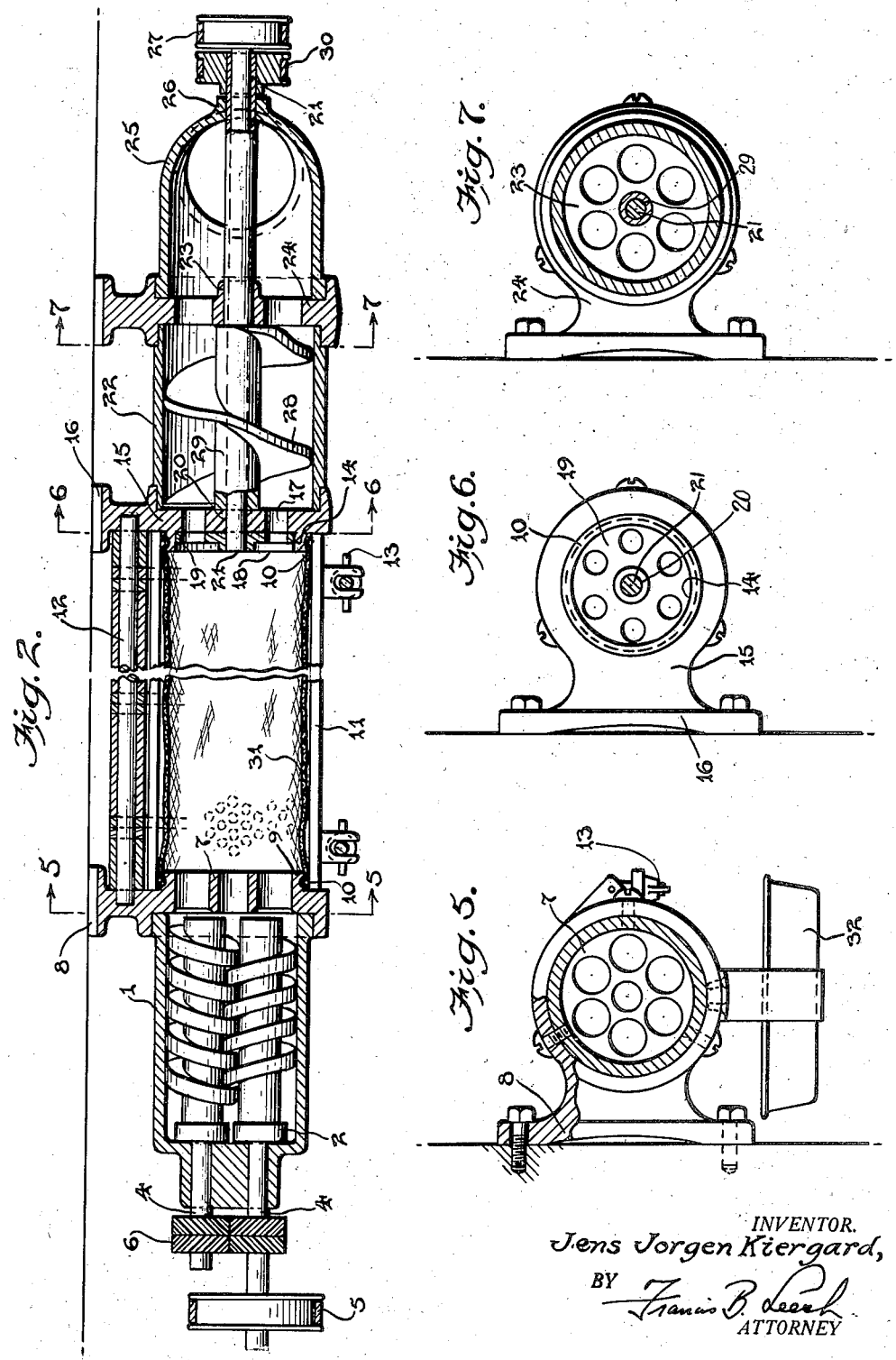

Patented Apr. 30, 1935

1,999,241

UNITED STATES PATENT OFFICE 1,999,241

CONTINUOUS EXTRACTING DEVICE

Jens Jorgen Kiergard, Winchester, Va., assignor to National Fruit Product Company, Inc., Washington, D. C.

Application August 14, 1933, Serial No. 685,096

8 Claims. (Cl. 100—48)

This invention relates to an extraction or expression press for use with all types of fruit.

An object of the invention is to construct a continuous press for squeezing or extracting the juice from fruit such as apples for use in cider and vinegar industries.

Heretofore, the juice of apples and other fruits has customarily been extracted by packing layers of initially macerated fruit in filter cloths, placing a plurality of these filter cloths in a filter press and subjecting the series of filter cloths to the action of a pressing piston. This is not only a costly operation but is attended by a number of difficulties, such as the large amount of hand labor involved, the proper packing of the fruit mash in the cloths, and the tremendous power necessary to operate the expressing piston.

With a press of the type hereinafter described, fruit, such as apples, either whole or initially macerated, may be continuously fed through the machine which will extract a large percentage of the juices in the fruit at a minimum of expense, labor, and handling. If desirable, the residual marc or pulp may be further expressed with the well known hydraulic presses of the prior art.

In the drawings, Fig. 1 is a side elevation of a continuously extracting press embodying the principles of the present invention.

Fig. 2 is a horizontal sectional view taken through the entire machine.

Fig. 3 is a vertical section taken on line 3—3 of Fig. 1.

Fig. 4 is a vertical section taken on line 4—4 of Fig. 1.

Figs. 5, 6, and 7 are vertical sections taken on their respective section lines indicated in Fig. 2.

Referring to Fig. 1, numeral 1 designates a hopper or feed trough having power driven screw conveyors 2 lying horizontally in the bottom portion 3. The drive shafts 4 of these screws project exteriorly of the trough bottom 2 and are driven by pulley 5 and gears 6, power being applied to the pulley 5 by any suitable means.

The forward ends of the screws 2 terminate adjacent a perforated distributing or baffle plate 7 which is attached or fitted to the end of the trough. This baffle plate 7 may be provided with a bracket 8 which in turn may be fastened to the floor or wall to support the apparatus.

A lateral flange 9 is formed on the side of the baffle plate and an annular groove 10 is cut into the outer periphery of the flange.

Encompassing the flange 9 is an elongated split perforated metallic cylinder 11 which is hinged at the rear, the sections being hinged on horizontal pin 12, and fastened together at the front by means of pivoted thumb screws 13.

The opposite end of the cylinder 11 encircles a second radial flange 14 formed on the perforated baffle plate 15 which is provided with a wall bracket 16. The baffle plate 15 has a number of equispaced passages 17 formed therethrough which register with a series of holes 18 in rotary valve plate 19 which is set in the lateral flange 14 and abuts the baffle plate.

The baffle plate 15 also has a central opening 20 formed in it to provide an end bearing for shaft 21 which is affixed to rotary valve 19. The shaft 21, of comparatively small diameter, extends horizontally through chamber 22 and bearing 23 in perforated baffle plate 24, after which it passes through exhaust chamber 25 and projects outwardly of the rear wall thereof through bearing extension 26. The shaft 21 terminates in a drive pulley 27 which is driven from any suitable source of power.

In cylindrical chamber 22 is mounted a rotatable spiral conveyor 28 which is of such a size and shape that it bears against the cylinder walls and the baffle plates 15 and plate 24. The central portion of this spiral 28 is a hollow cylinder 29 which completely encompasses the drive shaft 21, the elongated portion of the cylinder 29 being supported by bearing 23 in perforated baffle plate 24. The hollow cylinder 29 extends outwardly through exhaust casing 25 and end bearing 26, terminating in drive pulley 30 which lies adjacent and parallel drive pulley 27.

The perforated cylinder 11, heretofore described, is hinged and adapted to be opened by releasing the screw fasteners 13 for the insertion or removal of the filter bag or tube 31. It is preferable to insert a cord in the ends of the tube which fit in the grooves 10 of the end flanges 9 and 14. After a filter bag has been fitted over these flanges the cylinder sections are fastened together and so bind the ends of the filter bag around the end flanges.

It is also contemplated that metal screens made of Monel metal or the like may be substituted for the filter tubes. If screens are used, they need merely to be positioned around the end flanges and are retained in place by the perforated cylinder sections.

Suitably attached or supported from the press is a tray or other collection vessel 32, to receive the juice extracted. If desired, the vessel 32 may be fitted with a drain for continuously carrying away the liquid expressed.

In operation, whole or pulped apples or other fruit are deposited in the hopper 1 from whence they are further macerated by the conveyor screws 2 lying in the bottom of the hopper and forced through the openings in perforated plate 7. As soon as the cylinder 11 is filled with the crushed fruit, it will press against the face of rotary valve 18 so that a progressively increasing pressure is exerted on the fruit by the force of the screw conveyor. As heretofore described, the rotary valve 18 registers with perforations 17 formed in baffle plate 15 directly behind the valve. Consequently, as the valve 18 is rotated it alternately registers and closes the openings 17, and as the conveyor 2 is continuously feeding pulp into the expression cylinder, the pulp is subjected to a series of pressure impulses. As the fruit travels through the cylinder it is extracted more and more so that by the time it has traveled the length of the cylinder and is forced through the openings of the valve, it is substantially without liquid. To ensure that the dried pulp or marc will be properly exhausted, it is removed from the rear of the perforated plate 15 by the screw conveyor 28 which is rotated at a somewhat faster speed than the rotation of the valve 18. After being exhausted from the chamber 25, the marc may be further extracted in the customary pressure filter presses.

The split hinged pressure cylinder 11 may be quickly and easily opened by operating the thumb screws 13 for inspection, cleaning, and installation of fresh filter cloths or screens.

What I claim is:

1. In a press, a positively driven screw feeding mechanism discharging material interiorly at one end of a perforated cylinder, and an independently driven alternately opening and closing valve mechanism at the opposite end of said cylinder.

2. In a press, a positively driven screw feeding mechanism discharging material interiorly at one end of a perforated cylinder, and a rotary alternately opening and closing valve at the opposite end of said cylinder, said valve being affixed to an independently driven shaft, said shaft extending outwardly from said cylinder.

3. In a continuous extracting device, a material hopper, a positively driven interior feed mechanism for discharging material from said hopper into an elongated extracting device, means including said feed mechanism for subjecting said material while in said extracting device to progressively increasing pressure, and an alternately opening and closing rotary valve for relieving the pressure on said material, said valve being positioned in the end of the extracting device opposite from the said hopper, and an independent drive means for said valve.

4. In a continuous extracting press, a feed hopper for material, a positively driven screw conveyor in the bottom of said hopper adapted to discharge the material into one end of a tubular perforated cylinder lined interiorly with a filter, a rotary opening and closing abutment at the opposite end of said cylinder, and a rotating scraper constantly removing material from adjacent said rotary abutment, said rotary abutment and said scraper being independently rotated at different rates of speed.

5. In an extraction apparatus, a material hopper, an extraction cylinder, a positively driven feed mechanism for continuously forcing material from said hopper into one end of said cylinder, a fixed perforated baffle plate in the opposite end thereof, a rotary multiperforated baffle forming end discharge openings from said cylinder, said baffle being affixed to an independently rotated shaft extending outwardly from said cylinder and adapted to alternately open and close said discharge openings.

6. In a device of the character described, a feed hopper, a perforated distributing baffle, a perforated cylinder, said baffle extending into said cylinder, power driven mechanism for feeding material from said hopper through said baffle to said cylinder, an independently driven rotary valve extending into the opposite end of said cylinder and controlling the discharge therefrom, the said cylinder being split longitudinally into two sections, the sections being pivoted together at one split point and latched together at the other split point.

7. In a device of the character described, a power driven feed hopper, a multiperforated end baffle for said hopper forming a discharge nozzle therefor, a split perforated extracting cylinder, one end of said cylinder encircling the said discharge nozzle, the opposite end of said cylinder encircling an independently driven rotary valve and perforated baffle plate, a filter bag also encircling said discharge nozzle and said rotary valve and baffle plate, the said filter bag being retained in position by said split cylinder.

8. In a continuous extraction device, a material hopper, a perforated extraction cylinder, means for feeding material from said hopper into said cylinder, an elongated discharge casing surrounding the opposite end of said cylinder, a rotary valve in the end of said discharge casing adjacent the said cylinder, said discharge casing having a perforated baffle positioned near the end of said casing immediately behind said rotary valve, and a second perforated baffle positioned intermediate the length of said discharge casing, a drive shaft affixed to said rotary valve and extending outwardly through said discharge casing, said shaft being aligned through central openings formed in said perforated baffles, the end of said shaft extending through the end wall of said discharge casing and terminating in a drive pulley.

JENS JORGEN KIERGARD.